United States Patent [19]

Kennedy et al.

[11] 3,994,993

[45] Nov. 30, 1976

[54] DIBLOCK COPOLYMERS AND PROCESS OF PREPARING SAME

[75] Inventors: Joseph Paul Kennedy, Akron, Ohio; Earl George Melby, Somerville, N.J.

[73] Assignee: The Firestone Tire & Rubber Company, Akron, Ohio

[22] Filed: June 19, 1975

[21] Appl. No.: 588,279

[52] U.S. Cl. .................................. 260/877; 260/886

[51] Int. Cl.[2] .................... C08L 53/00; C08L 25/00

[58] Field of Search ..................... 260/886, 884, 877

[56] References Cited

UNITED STATES PATENTS

| | | | |
|---|---|---|---|
| 3,189,664 | 6/1965 | Nozaki | 260/881 |
| 3,287,298 | 11/1966 | D'Aleljo | 260/886 |
| 3,699,190 | 10/1972 | Shimomura | 260/877 |
| 3,754,055 | 8/1973 | Rembaum | 260/879 |
| 3,769,368 | 10/1973 | Peyrot | 260/877 |
| 3,800,007 | 3/1974 | Bafford | 260/877 |
| 3,823,203 | 7/1974 | de la Mare | 260/876 B |
| 3,894,119 | 7/1975 | Forbes et al. | 260/896 |
| 3,904,708 | 9/1975 | Kennedy et al. | 260/878 R |

FOREIGN PATENTS OR APPLICATIONS

| | | |
|---|---|---|
| 1,174,323 | 12/1969 | United Kingdom |

OTHER PUBLICATIONS

Morton et al., *Homogeneous Anionic Polyermization*, J. P. Science, vol. A1, (1963), pp. 443–482.

Kennedy; J. P. "Cationic Polymerization of Olefins: A Critical Inventory," John Wiley Interscience, (1975).

*Primary Examiner*—Murray Tillman

*Assistant Examiner*—Thurman K. Page

[57] ABSTRACT

Diblock copolymers, such as poly(styrene-b-isobutylene) are produced by carbenium ion mechanism, for example, isobutylene polymerization is initiated with a polystyrene molecule containing terminal tertiary bromine, and, diethylaluminum chloride as coinitiator. The resulting block copolymer can be recovered by selective extraction.

6 Claims, No Drawings

DIBLOCK COPOLYMERS AND PROCESS OF PREPARING SAME

BACKGROUND OF THE INVENTION

The synthesis of well-defined block copolymers continues to represent a difficult challenge in the field of polymer chemistry. The preparation of block copolymers by free radical, anionic, cationic and condensation techniques is surveyed in a review entitled "Recent Advances in Polymer Blends, Grafts and Block" L. H. Sperling, ed., pages 3–62, Plenum Press, New York, 1974; however, the characterization of these materials in terms of molecular weight, molecular weight distribution, solubilities, physical properties, etc., remains to be completed.

Anionic polymerization has been utilized to produce well-characterized block copolymers as described by M. Szwarc in Nature, 178, 1168 (1956) and by L. J. Fetters in "Block and Graft Copolymers" R. J. Ceresa, ed., pages 99–132, John Wilet-Interscience, New York, 1973.

In the field of cationic polymerizations, in contrast to the preceding frequently used techniques, well-defined block copolymers have been synthesized only in very few instances by oxonium ion polymerization of certain cyclic ethers. Thus Saegusa et al. as disclosed in Macromol., 3, 377 (1970) prepared a poly(tetrahydrofuran-b-bischloromethyloxetane) by first producing a "living"polytetrahydrofuran using $BF_3$-epichlorohydrin initiator in heptane at 0° C., removing the unreacted tetrahydrofuran, and introducing to this system bischloromethyloxetane. Living polytetrahydrofuran oxonium ions have been coupled with living polystyryl anions by Berger et al. as disclosed in J. Polymer Sci., B, 4, 183 (1966). A similar technique was utilized by Yamashita et al. Macromol., 4, 548 (1971).

An abstract has been published at the International Symposium on Cationic Polymerization by Y. Jolivet and J. Peyrot, Communication C18, International Symposium on Cationic Polymerization, Rouen, France, Sep. 16–20, 1973. This abstract briefly describes a method for the synthesis of a poly(styrene-b-isobutylene); in this publication, both the resulting product and process utilized are different from that herein described and claimed; the Jolivet et al. process is one wherein a benzyl chloride initiator in conjunction with diethylaluminum chloride coinitiator polymerized isobutylene giving rise to a polyisobutylene containing a terminal benzyl group

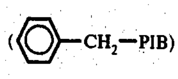

followed by chloromethylation to

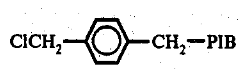

followed by introduction of styrene and $Et_2AlCl$ to give

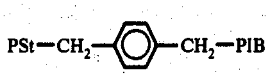

where PSt = polystyrene and PIB = polyisobutylene.

U.S. Pat. No. 3,769,368 sets forth a process for preparing a grafted copolymer wherein a homopolymer is formed with a benzene ring at one of its ends, followed by chloromethylation of said benzene ring and then cationically grafting monomer onto the chloromethyl group of said homopolymer to produce only PIB-PSt copolymer.

DESCRIPTION OF THE INVENTION

The present invention is directed to the synthesis of well-defined block copolymers of, for example, poly(styrene-b-isobutylene), (PSt-b-PIB), as can be produced by a carbenium ion mechanism.

The synthesis utilized to prepare the novel block copolymers of the present invention, such as PSt-b-PIB, can be summarized by the following scheme:

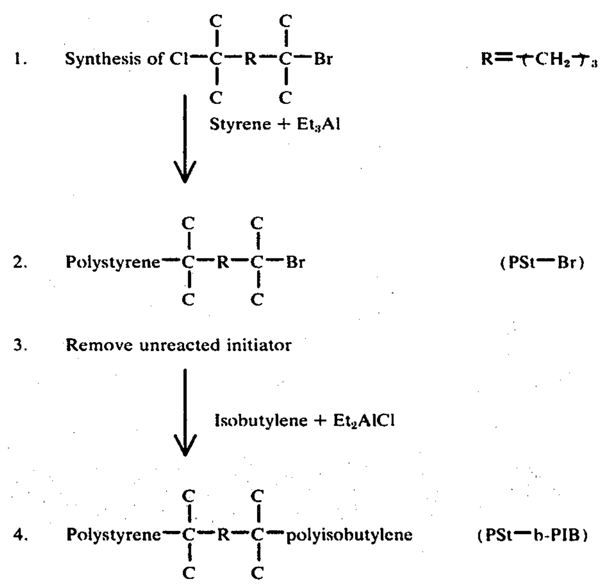

This synthesis of PSt-b-PIB, for example, was based on two key discoveries:

1. The large rate difference of halide substitution by trimethylaluminum between tert.-butyl chloride and -bromide. Halogen-removing selectivity is achieved with $Et_3Al$ in $CH_3Cl$ at −70° C., i.e., ~50% Cl replacement before any Br loss.
2. The discovery that the polymerization of styrene can be achieved in the absence of chain transfer by the use of certain alkylaluminum compounds, e.g., $Et_3Al$.

Initiator Preparation

In the practice of the present invention, first a suitable compound, for example one containing a tertiary chlorine and bromine, is synthesized and the polymerization of styrene, for example, is initiated by the tertiary chloride in conjunction with an alkylaluminum compound, followed by the polymerization of, for example, isobutylene by the tertiary bromine and an alkyl-aluminum. It was discovered that 2-bromo-2-chloro-2,6-dimethylheptane, in conjunction with certain alkylaluminum compounds, was suitable for the synthesis of PSt-b-PIB. A specific procedure that can be utilized to prepare said 2-bromo-2-chloro-2,6-dimethylheptane follows:

Scheme of Procedure

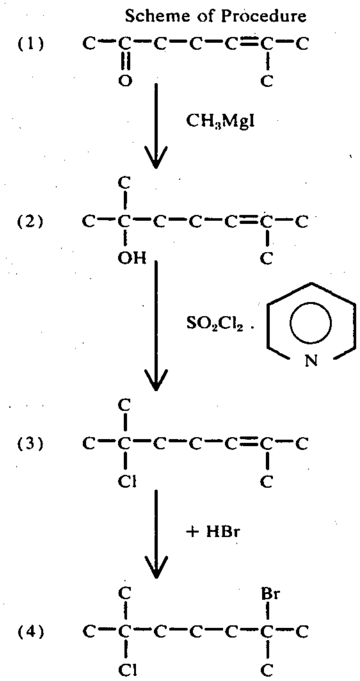

In a 1 liter three-neck flask equipped with stirrer, thermometer and nitrogen inlet-tube — at room temperature — was placed 6-methyl-5-heptane-2-one (0.4 M) and under a blanket of nitrogen was added to it under stirring $CH_3MgI$ (0.4 M) in 700 ml. diethylether. After stirring overnight, the reaction was quenched with excess water. Yield: 89% of 2,6-dimethyl-6-hydroxy-2-heptene (b.p. 85°/14 mm.). The latter product (0.34 M) was mixed with pyridine (0.34 M) and $CH_2Cl_2$(75 ml.) in a 250 ml. three-neck flask equipped with stirrer and thermometer, and under stirring at 0° C. dropwise $SOCl_2$ (0.34 M) was introduced. Distillation of the organic layer gave a yield of 63% of 6-chloro-2,6-dimethyl-2-heptene (b.p. 68°/12 mm.). The addition of HBr to the olefin was carried out by introducing slowly gaseous HBr at −78° C.

It has been determined that styrene polymerizations initiated by tertiary chlorides, for example, by tert.-butyl chloride and coinitiated, for example, by $Et_3Al$, proceed essentially in the absence of chain transfer (although termination by ethylation and hydridation occurs). This information was essential for the pure, homopolystyrene free, synthesis of polystyrene possessing a terminal tertiary bromine, PSt-Br. For example, the addition of 2-bromo-6-chloro-2,6-dimethylheptane to a charge of styrene and $Et_3Al$ in ethyl chloride at −80° C., readily yielded PSt-Br of $\overline{Mn}$ = 20,000, quite suitable for the subsequent isobutylene polymerization step.

Representative examples of specific isobutylene polymerizations using PSt-Br and $Et_2AlCl$ are illustrated in Table I which follows. Since more vigorous conditions are necessary to achieve initiation of isobutylene from the tertiary bromine site than from the chlorine site, a stronger Lewis acid, $Et_2AlCl$, and higher polymerization temperatures, from −45° to −65° C., were employed to achieve this step. Isobutylene conversion was greatest at −45° C. At the lower temperature, −65° C., a higher $Et_2AlCl$ concentration was necessary to initiate the polymerization of isobutylene.

TABLE I

ISOBUTYLENE POLYMERIZATION INITIATED BY PSt-Br/$Et_2AlCl$[1,2]

Reaction Conditions

| | $iC_4H_8$ g | PSt-Br g | $Et_2AlCl$ $M\times10^{-2}$ | Temp./Time ° C./min. | Conversion % |
|---|---|---|---|---|---|
| (a) | 2.1 | 0.92 | 1.4 | −45/45 | 95 |
| (b) | 31.5 | 7.8 | 1.4 | −55/30 | 38 |
| (c) | 2.1 | 0.50 | 4.2 | −65/30 | 43 |

Products[3]

| | MEK Insol. (Pst-b-PIB,PIB) | MEK + Pentane Sol. (PSt-b-PIB) | MEK + Heptane Sol. (PSt-b-PIB) | Pentane or Heptane Insol. (PSt) |
|---|---|---|---|---|
| (a) | 59% (PSt content = 15%) | 38% (PSt content = 66%) ($\overline{Mn}$ = 38,000) | — | 3% (PSt content = 100%) |
| (b) | 59% (PSt content = 20%) | 27% (PSt content = 70%) ($\overline{Mn}$ = 34,000) | 12% (PSt content = 79%) ($\overline{Mn}$ = 35,000) | 2% (PSt content = 100%) |
| (c) | 16% (PSt content = 17%) | 38% (PSt content = 21%) ($\overline{Mn}$ = 42,000) | 44% (PSt content = 47%) ($\overline{Mn}$ = 55,000) | 2% (PSt content = 100%) |

[1]PSt-Br synthesis conditions: To a solution of styrene, 0.10 mole, in ethyl chloride, 80 ml., and $Et_3Al$, $4.8\times10^{-3}$ moles, was introduced 2-bromo-6-chloro-2,6-dimethylheptane, $8.0\times10^{-4}$ moles, at −80° C.; quench with methanol after 5 min.; yield 7.7 g. (74%), $\overline{Mn}$ = 20,000.
[2]Solvent for isobutylene polymerization, v/v: $CH_2Cl_2$/hexane = 65/25.
[3]Percent on basis of final polymer yield. Experimental error: Experiments a and c = 10%; Experiment b = 4%.

Since the possibility for chain transfer in isobutylene polymerization initiated by the PSt-Br/$Et_2AlCl$ system exists, the possibility for homopolyisobutylene formation also arises. Consequently, a careful selective extraction procedure was utilized to separate the pure poly(styrene-b-isobutylene) from the crude product, i.e., that contaminated by homopolyisobutylene.

Scheme I which follows illustrates the selective extraction procedure together with the yields (wt. %) and compositions (wt. % by nmr) of the fractions obtained from the polymer prepared at −55° C. Methyl ethyl ketone (MEK) a nonsolvent for polyisobutylene, dissolves polystyrene and low molecular weight PSt-b-PIB, rich in polystyrene. The MEK-insoluble fraction contains homopolyisobutylene along with PSt-b-PIB of the lower polystyrene content. Gel permeation chromatograms of the material before and MEK extraction establish the separation of the two fractions. The GPC curve of the unextracted material shows a shoulder indicating the presence of lower molecular weight polymer which becomes soluble upon extraction with MEK. The MEK-insoluble polymer is of higher molecular weight material, composed of both homopolyisobutylene and PSt-b-PIB.

SCHEME I

Extraction Procedure Used To Obtain Pure PSt-b-PIB

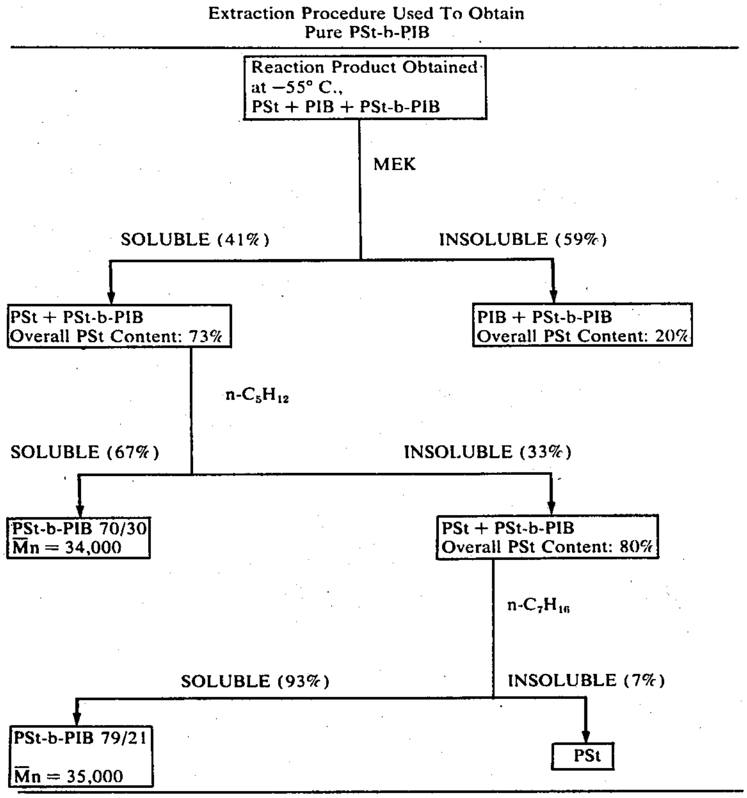

Subsequent extraction of the MEK-soluble material with n-pentane and n-heptane, nonsolvents for polystyrene, resulted in soluble fractions containing pure PSt-b-PIB. The fact that only insignificant quantities (2–3%) of homopolystyrene were recovered, demonstrates the substantial absence of chain transfer in the synthesis of PSt-Br and leads to the expected high levels of terminal tertiary bromine in polystyrene. It can be seen from Table I that the MEK-insoluble fraction is smallest for the product obtained at −65° C. demonstrating the presence of a significantly lower amount of homopolyisobutylene. This is consistent with the fact that chain transfer is reduced at lower temperatures.

Any dihalogen compound two different tertiary, allylic or benzylic halogens can be utilized.

Polymerization temperature range can be from about −20° to about −80° C., preferably from about −45° to about −65° C.

Many alkylaluminums can be used. Examples include: $(CH_3)_3Al$, $(C_2H_5)_3Al$, $(iC_4H_9)_3Al$, $(C_2H_5)_2AlCl$, $(C_2H_5)_2AlH$, $(C_2H_5)_2AlBr$ and $(C_2H_5)_2AlI$.

Characterization of Poly(Styrene-b-Isobutylene) Isolated From the Product Prepared at −55° C.

The block copolymer formed cloudy solutions in n-pentane (a good solvent only for polyisobutylene) and in MEK, (a solvent only for polystyrene). Apparently, in these solvents, the soluble polymer segment forces the insoluble segment attached to it into solution. In cylcohexane at room temperature, slightly hazy solutions were obtained which, however, became clear when heated above the theta temperature of polystyrene (35° C.), the temperature level beyond which cyclohexane becomes a good solvent for polystyrene. In contrast, the block copolymer formed visually clear solutions in toluene, benzene, and $CCl_4$, good solvents for both polystyrene and polyisobutylene.

Films cast from solutions of PSt-b-PIB in benzene were homogeneous and partially transparent. Films cast from cyclohexane were striped presumably due to phase separations since cyclohexane is a poor solvent for polystyrene below 35° C. The resulting copolymer exhibited two Tg's (by DSC) at 369° and 199° K; these are characteristic of polystyrene and polyisobutylene respectively.

The following experimental data and examples are representative and specifically illustrate the present invention.

EXAMPLE

All experiments were carried out in a stainless steel enclosure under $N_2$ atmosphere moisture content <50 ppm. Number average molecular weights were determined using toluene solutions and a HP 503 high speed membrane osometer at 37° C. Gel permeation chromatograms were determined using a Waters Associates Ana-Prep Instrument, using dilute polymer solutions (0.25%) of tetrahydrofuran at 37° C. Molecular weights by GPC were determined from a calibration curve obtained from well-characterized polystyrene samples of known $\overline{M}n$ and $\overline{M}w$. The glass transition temperatures, Tg's, were determined by differential scanning calorimetry (DSC) using a Perkin-Elmer DSC-IB instrument. The weight percent composition of the block copolymer was determined by NMR (Varian T-60). The relationship used to calculate polymer composition was:

$$\% \text{ Polystyrene} = \frac{104A}{[104A + 56(B - 0.6A)(5/8)]}$$

where: A = integrated area from aromatic protons, B= integrated area from aliphatic protons.

Monomers and solvents were purified by standard techniques. Alkylaluminum coinitiators, such as $Et_3Al$ and $Et_2AlCl$ can be utilized.

The Synthesis of Polystyrene-$C(CH_3)_2$-$(CH_2)_3$-$C(CH_3)_2$ Br(PSt-Br)

Styrene, 0.10 mole, was dissolved in 60 ml. ethyl chloride (EtCl). $Et_3Al$, 4.8 × 10⅓³ mole in 10 ml. of EtCl was added to the styrene solution followed by 2-bromo-6-chloro-2,6-dimethylheptane, $8.0 \times 10^{-4}$ moles, in 10 ml. EtCl. After five minutes at −80° C., the reaction was quenched with methanol. The solvent was removed and the polymer dried in vaco overnight; 74% conversion, $\overline{M}n$ = 25,000 (by osmometry), 20,000 (by GPC), $\overline{M}w$ = 40,000 (by GPC).

Removal of Unreacted Initiator

To insure the complete removal of unreacted initiator and aluminum oxides, the polystyrene was dissolved in $CH_2Cl_2$, filtered and precipitated into methanol. The precipitated polymer was filtered, washed several times with methanol and dried.

The Synthesis of Polystyrene-$C(CH_3)_2$-$(CH_2)_3$-$C(CH_3)_2$-Polyisobutylene (PSt-b-PIB)

Polystyrene-$C(CH_3)_2$-$(CH_2)_3$-$C(CH_3)_2$-Br, 7.8 g, was dissolved in a mixture of 375 ml. of $CH_2Cl_2$ and 150 ml. of hexane. To this solution was added isobutylene, 31.5 g., followed by $Et_2AlCl$, $5 \times 10^{-3}$ moles, in 10 ml. of hexane. During the polymerization at −55°, a gradual increase in turbidity was observed. After 30 minutes (38% conversion), the reaction was quenched with methanol and the polymer precipitated into ethanol and dried.

Prior to the polymerization experiments, control experiments were preformed to monitor the purity of the reagents. Monomer, solvent and alkylaluminum were combined in the same proportions as used for polymerization. After termination, the absence of any polymer in the control indicated the purity of the reagents. Polystyrene, prepared cationically using t-butyl chloride initiator and purified in the same manner as polystyrene-$C(CH_3)_2$-$(CH_2)_3$-$C(CH_3)_2$-Br did not initiate polymerization of isobutylene under identical conditions, demonstrating satisfactory purification techniques.

Extractions were carried out by repeated refluxing of the polymer in MEK, followed by centrifuging. Pentane and heptane extractions were carried out in a soxhlet apparatus.

Solvents that can be utilized include $CH_3Cl$, $C_2H_5Cl$, $CS_2$, chlorobenzene, in mixture with n-pentane, n-hexane, cyclohexane and benzene.

The novel high molecular weight A-b-B block copolymers of this invention are produced by carbenium ion mechanism; in said copolymers the internal linking member -b- is derived from a dihalongenated compound having the structure:

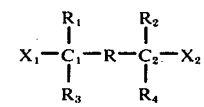

wherein $X_1$ and $X_2$ are different initiation sites inducing different polymerization rates, and are selected from the group consisting of F, Cl, Br and I; $C_1$ and $C_2$ are tertiary, allylic or benzylic carbons; $R_1$, $R_2$, $R_3$ and $R_4$ are the same or different and are selected from the group consisting of aliphatic radicals of 1 to 4 carbon atoms, cycloaliphatic radicals and aryl radicals; R is a saturated hydrocarbon containing 3–12 carbon atoms, the carbons can be aliphatic or aromatic in said dihalogenated compound; said $C_1$, $C_2$ are polymerization initiation sites after removal of said $X_1$ and $X_2$ by the addition of alkylaluminum coinitiator; said A and B are different cationically polymerizable olefins.

Our preferred high molecular weight block copolymer is poly(styrene-b-isobutylene) produced by carbenium ion mechanism in which copolymer internal linking member -b- is derived from the dihalogenated compound:

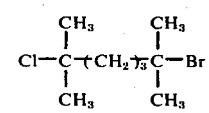

wherein said Cl and said Br are initiation sites inducing different polymerization rates.

The novel subject matter of our invention herein described and claimed includes the process of producing high molecular weight block copolymers of the A-b-B class by carbenium ion mechanism wherein said A and said B are different cationically polymerizable olefins being derived from a dihalogenated compound having the structure:

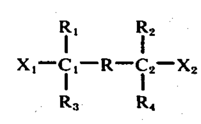

wherein $X_1$ and $X_2$ are different initiation sites inducing different polymerization rates, and are selected from the group consisting of F, Cl, Br and I; $C_1$ and $C_2$ are tertiary, allylic or benzylic carbons; $R_1$, $R_2$, $R_3$and $R_4$ are the same or different and are selected from the group consisting of aliphatic radicals of 1 to 4 carbon atoms, cycloaliphatic radicals and aryl radicals; R is a saturated hydrocarbon containing 3–12 carbon atoms, the carbons can be aliphatic or aromatic in said dihalogenated compound; said process comprising the sequential steps of:

1. reacting said dihalogenated compound -b- containing two different tertiary, allylic or benzylic halogens with said A olefin monomer and alkylaluminum coinitiator;
2. reacting the polymerized reaction product of step (1) with said B olefin monomer and dialkylaluminum halide as coinitiator.

Our preferred process is one of preparing high molecular weight block copolymer of poly(styrene-b-isobutylene) wherein isobutylene polymerization is initiated with a polystyrene molecule containing terminal tertiary bromine in the presence of diethylaluminum chloride as coinitiator.

The process of this invention can be conducted at temperature from about −20° to about −80° C.; from about −45° to about 65° C. is preferred.

In the high molecular weight A-b-B block copolymers of this invention, A and B monomers are different cationically polymerization olefins such as those set forth in the book "Cationic Polymerization of Olefins: A Critical Inventory" by Joseph P. Kennedy, John Wiley Interscience 1975. Specific monomers which can be utilized include: alpha-methylstyrene, p-methylstyrene, p-chlorostyrene, derivatives of styrene, indene and acenaphthylene, β-pinene, 3-methyl-1-butene and 4-methyl-1-pentene. The combination of styrene monomer and polyisobutylene monomer is preferred.

The preceding examples can be varied within the context of this total specification as construed by one skilled in the art to achieve substantially the same results. Equivalent monomers, reactants and/or process conditions can be utilized as would be comprehended by one skilled in the art to produce the novel block copolymers herein described and claimed. Our paper entitled "Block and Graft Copolymers by Selective Cationic Initiation. II. Synthesis and Characterization of StyreneIsobutylene Block Copolymers by Use of Chlorobrominated Alkanes" J.P.S.: Polymer Chemistry Edition, Vol. 13, 29–37 (1975) is incorporated by reference at this point. The new block copolymers of this invention can be readily processed, blended, compounded, grafted, etc., to produce useful end products having desired performance and property characteristics. For example, the novel block copolymers of this invention can be utilized as oil additives to improve viscosity and in the preparation of specialty membranes.

What is claimed is:

1. High molecular weight A-b-B block copolymers produced by carbenium ion mechanism in which copolymers the internal linking member -b- is derived from a dihalogenated compound having the structure:

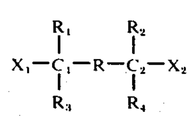

wherein $X_1$ and $X_2$ are different initiation sites inducing different polymerization rates, and are selected from the group consisting of F, Cl, Br and I; $C_1$ and $C_2$ are tertiary, allylic or benzylic carbons; $R_1$, $R_2$, $R_3$ and $R_4$ are the same or different and are selected from the group consisting of aliphatic radicals of 1 to 4 carbon atoms, cycloaliphatic raddicals and aryl radicals; R is a saturated hydrocarbon containing 3–12 carbon atoms, the carbons can be aliphatic or aromatic in said dihalogenated compound; said $C_1$, $C_2$ are polymerization initiation sites after removal of said $X_1$ and $X_2$ by the addition of alkylaluminum coinitiator; said A and B are different cationically polymerizable olefins.

2. High molecular weight block copolymers of poly(styrene-b-isobutylene) produced by carbenium ion mechanism in which copolymer internal linking member -b- is derived from the dihalogenated compound:

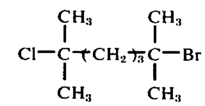

wherein said Cl and said Br are initiation sites inducing different polymerization rates.

3. Process for producing high molecular weight block copolymers of the A-b-B class by carbenium ion mechanism wherein said A and said B are different cationically polymerizable olefins being derived from a dihalogenated compound having the structure:

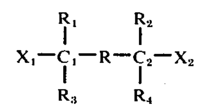

wherein $X_1$ and $X_2$ are different initiation sites inducing different polymerization rates, and are selected from the group consisting of F, Cl, Br and I; $C_1$ and $C_2$ are tertiary, allylic or benzylic carbons; $R_1$, $R_2$, $R_3$ and $R_4$ are the same or different and are selected from the group consisting of aliphatic radicals of 1 to 4 carbon atoms, cycloaliphatic radicals and aryl radicals; R is a saturated hydrocarbon containing 3-12 carbon atoms, the carbons can be aliphatic or aromatic in said dihalogenated compound; said process comprising the sequential steps of:

1. reacting said dihalogenated compound -b- containing two different tertiary, allylic or benzylic halogens with said A olefin monomer and alkylaluminum coinitiator;
2. reacting the polymerized reaction product of step (1) with said B olefin monomer and dialkylaluminum halide as coinitiator.

4. Process for preparing high molecular weight block copolymer of poly(styrene-b-isobutylene) wherein isobutylene polymerization is initiated with a polystyrene molecule containing terminal tertiary bromine in the presence of diethylaluminum chloride as coinitiator.

5. The process of claim 4 wherein the polymerization temperature is from −20° to −80° C.

6. The process of claim 4 wherein the polymerization temperature is from −45° to −65° C.

* * * * *